United States Patent
Putzolu

(10) Patent No.: US 6,578,076 B1
(45) Date of Patent: Jun. 10, 2003

(54) POLICY-BASED NETWORK MANAGEMENT SYSTEM USING DYNAMIC POLICY GENERATION

(75) Inventor: David Matthew Putzolu, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/419,804

(22) Filed: Oct. 18, 1999

(51) Int. Cl.[7] .................. G06F 15/173; G06F 15/16
(52) U.S. Cl. ................. 709/223; 709/224; 709/219; 709/229
(58) Field of Search .................. 709/223, 224, 709/219, 229

(56) References Cited

U.S. PATENT DOCUMENTS

| | | | | |
|---|---|---|---|---|
| 5,889,953 A | * | 3/1999 | Thebaut et al. ............. | 709/221 |
| 5,918,015 A | * | 6/1999 | Suzuki et al. ............... | 709/219 |
| 6,061,721 A | * | 5/2000 | Ismael et al. ............... | 709/223 |
| 6,104,700 A | * | 8/2000 | Haddock et al. ............ | 370/235 |
| 6,167,445 A | * | 12/2000 | Gai et al. .................... | 709/223 |
| 6,301,613 B1 | * | 10/2001 | Ahlstrom et al. ........... | 709/223 |
| 6,327,618 B1 | * | 12/2001 | Ahlstrom et al. ........... | 709/223 |
| 6,389,589 B1 | * | 5/2002 | Mishra et al. .............. | 717/170 |
| 6,463,470 B1 | * | 10/2002 | Mohaban et al. ........... | 709/223 |
| 6,466,984 B1 | * | 10/2002 | Naveh ........................ | 709/228 |

OTHER PUBLICATIONS

Michele Wright, "Using Policies for Effective Network Management", International Journal of Network Management 9, 118–125 (1999).*

James W. Stamos et al., "Remote Evaluation", ACM Transaction on Programming Languages and Systems, vol. 12, No. 4, Oct. 1990, pp. 537–565.*

* cited by examiner

Primary Examiner—Krisna Lim
(74) Attorney, Agent, or Firm—Kenyon & Kenyon

(57) ABSTRACT

A system and method for managing a network involves evaluating a condition relating to a network resource. In response to that evaluation, instructions are generated for managing access to the network resource. These instructions are then sent to be installed on a network device that provides access to the network resource.

48 Claims, 6 Drawing Sheets

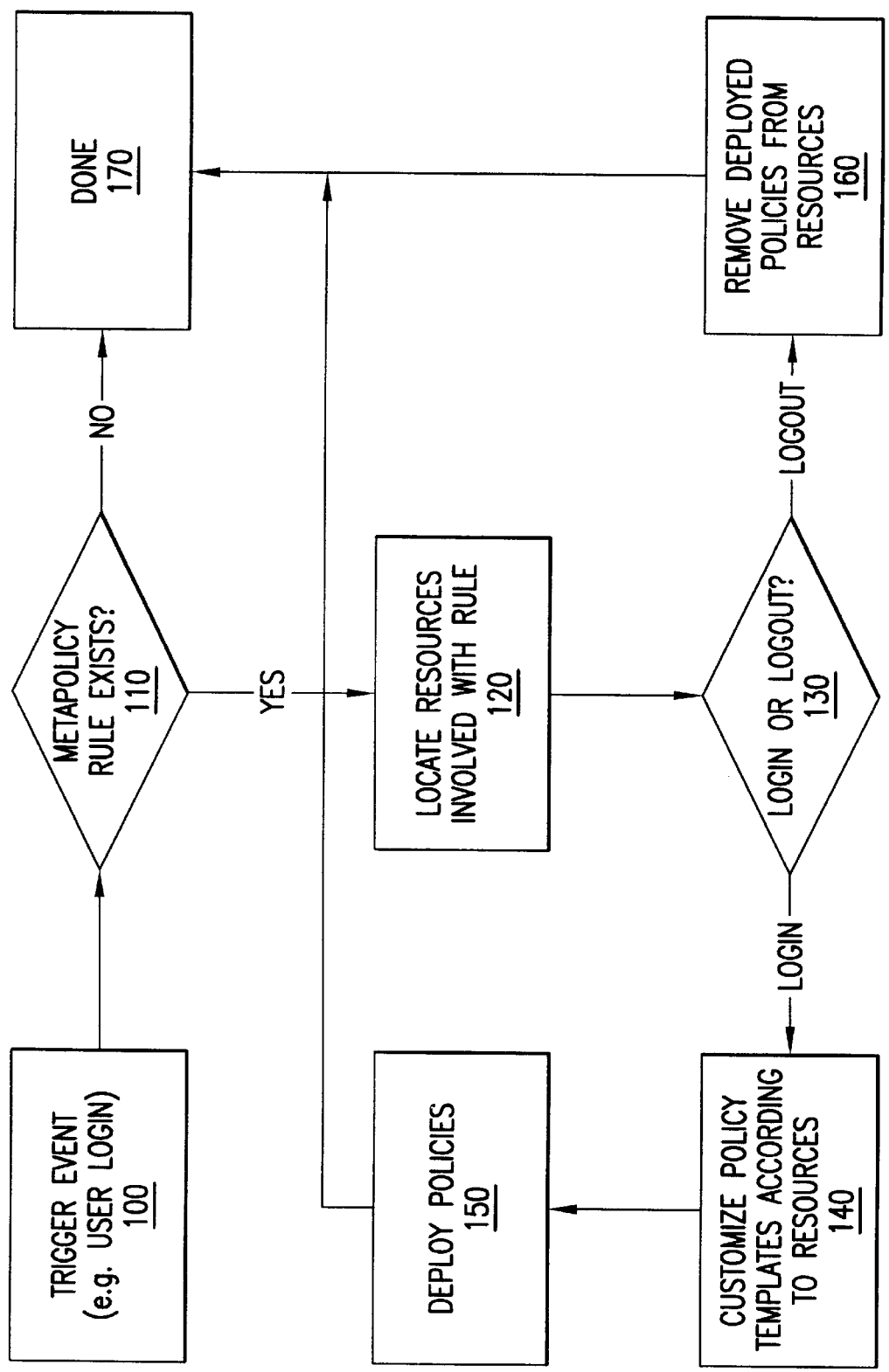

POLICY-BASED NETWORK MANAGEMENT SYSTEM USING DYNAMIC POLICY GENERATION

FIELD OF THE INVENTION

The present invention relates generally to the field of computer networking, and in particular to an improved policy-based network management system.

BACKGROUND OF THE INVENTION

A computer network, such as a corporate intranet, a local area network (LAN), or a wide area network (WAN), can be viewed as a collection of network resources. Network resources might include, for example, database servers, hosts, switches, routers, and firewalls. Since there are typically many different users competing for access to the same network resources, it is desirable to have some form of network management facility.

In the current state of the art, console-based management is the most common approach to network management. In console-based management, one or more console operators (typically members of an information technology group or similar organization within an enterprise) manually configure each resource on the network to implement the enterprise's policies for network use. However, console-based management is labor intensive, and is typically slow to respond to changing network conditions.

Recently, a new technology called policy-based network management (PBNM) has emerged. PBNM allows policies relating to the use of network resources to be stored in a management system for use in a more automated fashion than is generally possible with console-based management.

From an architectural standpoint, a PBNM system includes several different types of entities. Policy decision points (PDPs) store policies, examine requests for access to network resources received from policy enforcement points (PEPs), and compare such requests to any policies that have been established for those resources. If such established policies exist, PDPs decide on the appropriate action (e.g., approve or deny an access request) and accordingly inform one or more policy enforcement points (PEPs). Policy enforcement points are responsible for enforcing the policy decision.

A potential shortcoming of current PBNM technology relates to limitations on the flexibility of the management system. One approach to providing flexibility for policy-based network management has been to specify in advance all possible policies relating to each managed resource. However, such an approach requires substantial administrator time to establish the policies; consumes large amounts of storage space on policy servers and PDPs, since each policy related to a policy enforcement point must be maintained; and consumes significant processing time because policy servers and PDPs must evaluate potentially large numbers of policies each time a request for a network resource is received. Another approach has been to configure policies with "wildcards," wherein a policy includes one or more variables that may be satisfied by a number of different values or conditions. While this latter approach helps reduce system administrator time and storage requirements, substantial processing time is still required to evaluate potentially large numbers of policies and to resolve any wildcard references included therein.

SUMMARY OF THE INVENTION

The present invention relates to an improved policy-based network management system. In accordance with a particular embodiment, a computer-implemented method for managing a network includes evaluating a condition relating to a network resource, generating instructions for managing access to the network resource in response to the evaluation, and installing the instructions on a network device providing access to the network resource.

BRIEF DESCRIPTION OF THE DRAWINGS

FIG. 6 is a flow diagram for dynamic policy processing in accordance with an embodiment of the present invention using the data structure illustrated in FIG. 5.

DETAILED DESCRIPTION

The present invention relates generally to an improved policy-based network management system. Policy-based network management is a relatively-recent advance in the field of network management, responding in part to dramatic changes that have taken place in the way the Internet and corporate networks (e.g., intranets) are used. PBNM has proven to be a valuable mechanism for controlling access to network resources, for promoting responsible use of network bandwidth, multicast groups, security and encryption, and other such resources, and for enabling centralized control of widely-distributed devices.

One existing approach to policy-based network management applies a client-server paradigm, and assumes that individual network devices outsource policy decisions to management devices, called policy servers. Under this model, one or more policy servers are responsible for applying established policies to requests for use of network resources. Network devices, such as routers and switches, act as policy clients, relying on the policy server for policy-based admission control. For example, when a router receives a request to join an IP (Internet Protocol) multicast group, the router would communicate with a predetermined policy server to query whether the request can be accepted under the currently-established policies.

Figure 1:
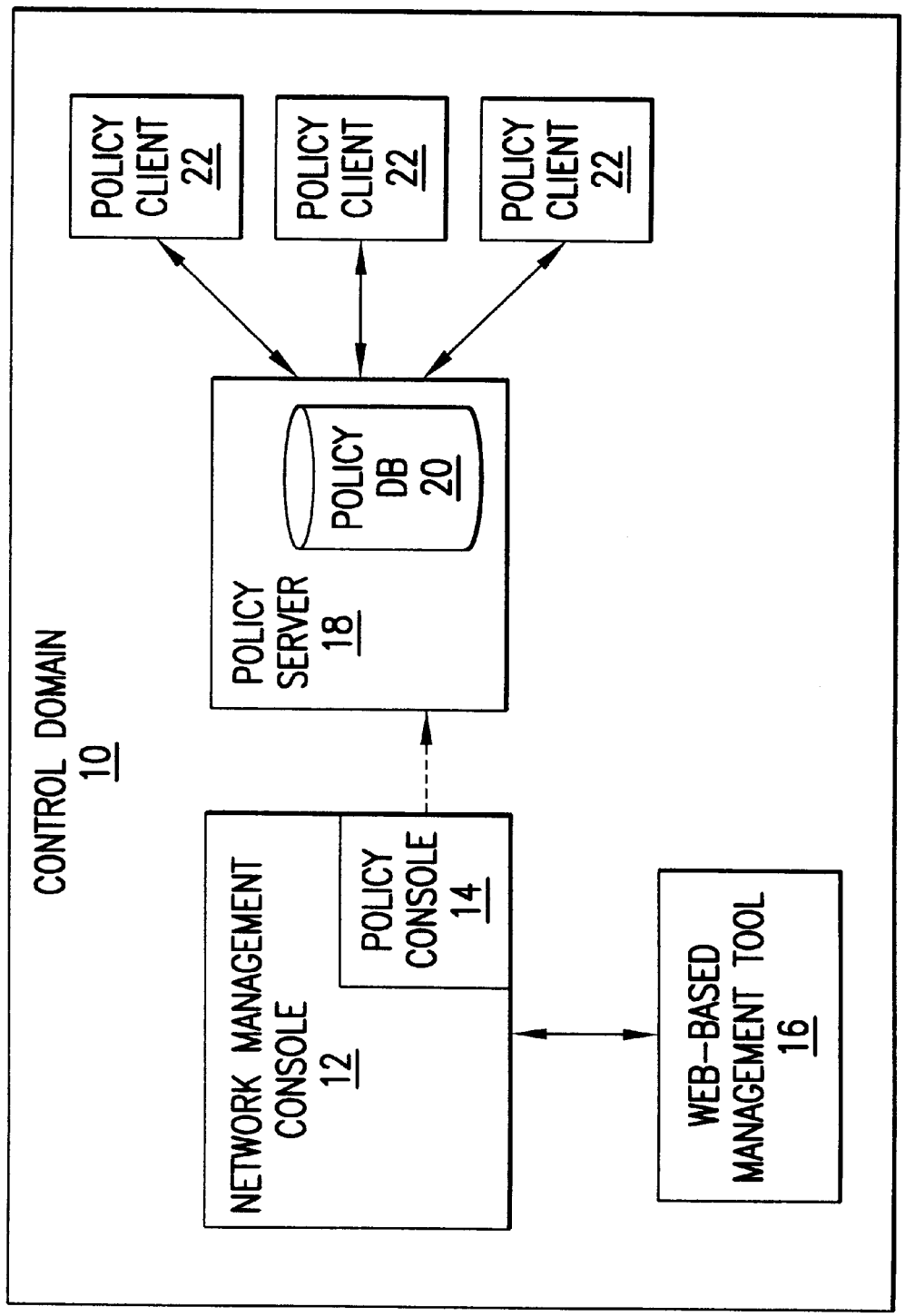
FIG. 1 is a block diagram of a PBNM architecture of a type in which embodiments of the present invention may be implemented.

FIG. 1 illustrates in general fashion one possible implementation of a PBNM architecture to which embodiments of the present invention may be directed. The illustrated architecture assumes a single control domain 10 for network management purposes. Control domain 10 may be, for example, a Windows NT domain or a routing administrative domain (AD). Within control domain 10, a policy console 14 is used to configure, administer, and monitor policies and their use. In this example, policy console 14 comprises a plug-in module installed in an existing network management console 12, such as the OpenView management console available from Hewlett-Packard or the Tivoli Netview management console available from IBM. Policy console 14 may also be accessible through a Web-based management tool 16, such as an appropriately-configured browser.

Control domain 10 includes a policy server 18 accessible through policy console 14. While only a single policy server 18 is illustrated, it is possible to incorporate a plurality of policy servers in any given control domain. Policy server 18 is configured to implement policies relating to the management of a group of network devices within control domain 10. To this end, policy server 18 maintains a policy database 20 containing policy specification information for established policies. Policy server 18 may also maintain a log (not shown) of its own activity, which log can be used to, for example, supply accounting information for billing and further tuning of resource control policies. Policy console 14 is configured to enable viewing, configuration, and modification of policy database 20, as well as to enable monitoring of activities at policy server 18. Although policy database 20 is shown as part of policy server 18, it need not be physically resident on policy server 18.

Policy server 18 is capable of communicating with a plurality of policy clients 22. Each policy client 22 serves as a policy enforcement point for policy-based control over the use of network resources. For instance, a request for use of a network resource may arrive at policy client 22, which must then apply active policies to determine whether or not to admit such a request. In the PBNM architecture shown in FIG. 1, policy client 22 is configured to outsource such decisions to policy server 18. Based on the response from policy server 18, policy client 22 enforces the decision by either allowing or disallowing the request.

Policy client 22 typically resides at a network device responsible for data forwarding, such as a LAN switch, a router, or a firewall. In the PBNM architecture shown in FIG. 1, policy client 22 can be configured with a relatively-simple structure because it off-loads policy-interpretation tasks to policy server 18. For example, when policy client 22 receives a request for access to a resource under its control, it simply sends a query to policy server 18 using an appropriate protocol (an example of which is described below). Policy server 18 determines whether to allow the access, and communicates the decision to policy client 22. Policy client 22 may also cache responses from policy server 18 for future use.

In the arrangement shown in FIG. 1, policy server 18 is responsible for the majority of the policy-related functionality, and is capable of managing a plurality of clients with potentially-diverse policy criteria. To support this type of flexibility, as well as to permit extensibility, policy-server 18 applies an object-based representation and exchange of information.

Figure 2:
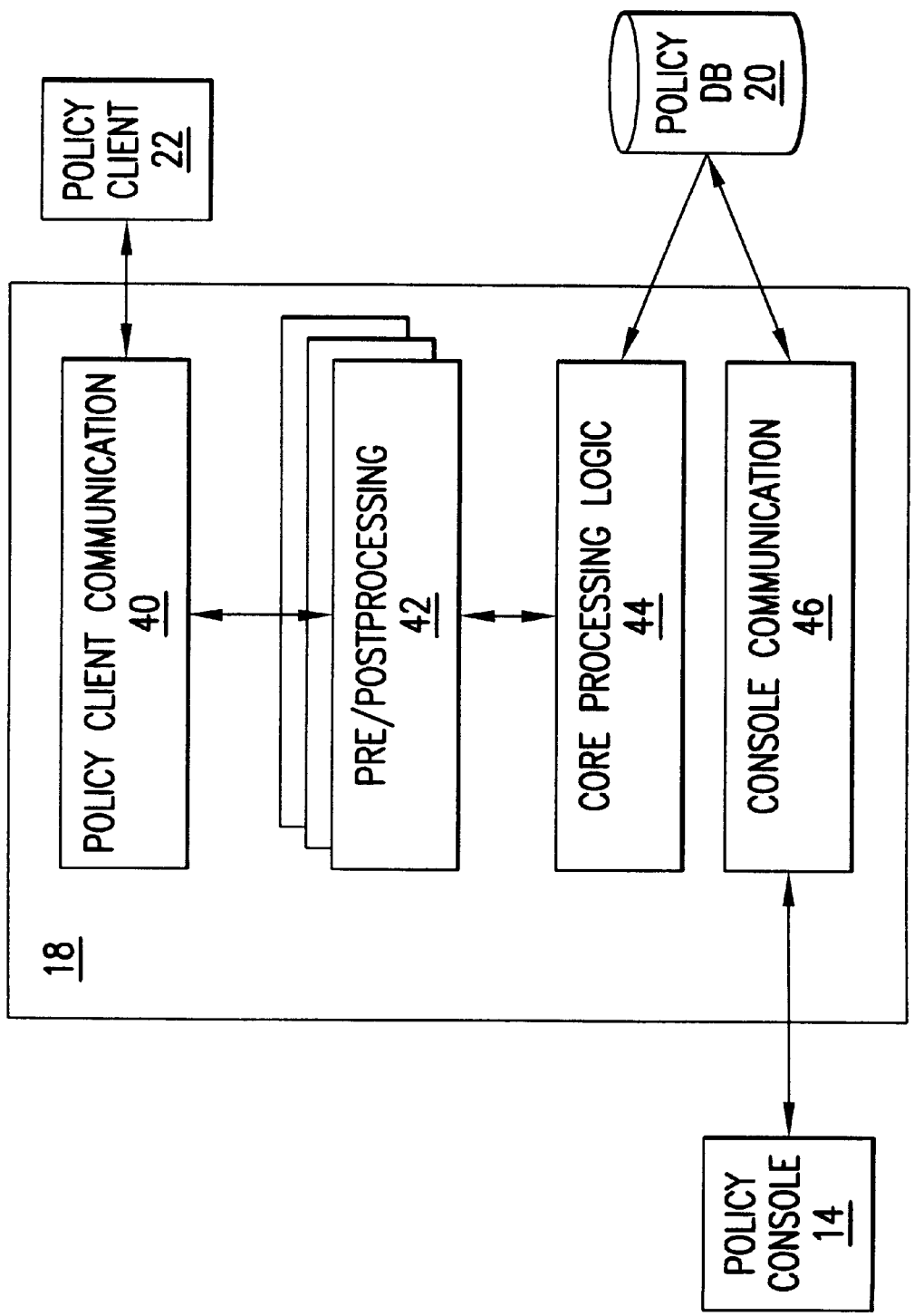
FIG. 2 is a block diagram of a policy server for use in accordance with the PBNM architecture of FIG. 1.

As is generally known in the art, policy server 18 comprises four major components, as shown in FIG. 2. Policy client communication module 40 is responsible for handling communications with the various policy clients 22 in communication with policy server 18. Pre/postprocessing module 42 is responsible for preprocessing, interpretation and postprocessing of wire-format objects for use within the internal policy structures. Core processing logic module 44 provides the core logic for policy server 18, and includes the policy structures and processing for their application. Finally, console communication module 46 handles communication with policy console 14 (and/or Web-based management tool 16). Core processing logic module 44 also handles authentication (with the aid of a possibly-remote authentication server (not shown)) and logging of all relevant information into a common SNMP (Simple Network Management Protocol) MIB (Management Information Base) that can then be used for purposes of, for example, accounting, monitoring, and billing. SNMP is a means for remotely accessing information about the status and configuration of network devices, while an MIB is used to define structure and syntax for information that is specific to a particular set of functionality provided by a device. Thus, for example, a system administrator might use SNMP to access an MIB that contains logging information about policy decisions made by a PDP.

Policies are often configured in a manner that facilitates automated parsing. For example, a policy relating to use of bandwidth on a particular network segment might be configured as follows:

Allow User_X to use up to 1 Mbit/s of bandwidth on Subnet_Y between 8 AM and 5 PM.

This policy would then be used by the network management system to dynamically determine whether to grant a request by User_X for access to Subnet_Y.

Policies can also be implemented with "wildcards" to provide increased flexibility. For example, the above policy could be more generally expressed as:

Allow User_X to use up to 1 Mbit/s of bandwidth on ANYSUBNET between 8 AM and 5 PM, where "ANYSUBNET" is a variable that permits the condition to be satisfied by a request for access to any subnet, including but not limited to Subnet_Y. Implementation of such wildcards is widespread in PBNM systems, as they are useful for authoring policies where the conditions that will be present at the time the policy is enforced are not fully known ahead of time.

To illustrate the operation of the PBNM system shown in FIG. 1, consider a set of policies designed to restrict the use of network bandwidth on a corporate intranet. In this arrangement, an application desiring access to a network resource, such as a corporate database, can use a protocol such as RSVP (Resource ReSerVation Protocol), to request reservation of bandwidth for a data stream, and the request propagates from the application through the network towards the source of the desired data stream (i.e., the database server). The request must be accepted by each intermediate device on this path, such as routers and subnet bandwidth managers (SBMs). In a typical non-PBNM LAN configuration, an SBM is responsible for accepting or denying a bandwidth reservation request, whereas a router is responsible for reservation on its point-to-point links. A router or an SBM uses locally-maintained state information to determine whether or not there is sufficient bandwidth available to admit the request. However, in a PBNM system the SBM or the router must also take into account any established policy restrictions (e.g., restrictions on who can reserve bandwidth depending on factors such as requester identity, time of day, identity of the source or sink of the traffic, etc.) before accepting the request.

Thus, referring again to FIG. 1, in such a case the SBM or router (i.e., a policy client 22) sends a query with relevant information to policy server 18. Policy server 18 uses information stored in policy database 20 and current state information (e.g., state of any already-admitted requests) to determine whether to accept the request, and then sends a response to policy client 22. Policy client 22 then either admits or denies the request as appropriate. In such an arrangement, policy server 18 comprises a policy decision point and policy client 22 comprises a policy enforcement point.

Communication of policy information between policy server 18 and policy client 22 can be accomplished, for example, using a simple request-response protocol based on TCP (Transfer Communications Protocol) for reliable exchange of messages. To facilitate such interactions between policy client 22 and policy server 18, policy client 22 may include a local policy module (LPM) (not shown) that communicates with policy server 18 for policy decisions. In the arrangement of FIG. 1, for example, the LPM would initially establish a TCP connection to policy server 18, and then use that connection to send queries or requests to policy server 18, and to receive responses from policy server 18. Communication between the LPM and policy server 18 is mainly in the form of request-response exchanges, although policy server 18 can also send unsolicited messages to policy client 22 to, for example, force a change to a previously-approved state.

In accordance with particular implementations, responses from policy server 18 to policy client 22 may be in the form of an Accept with Priority. For example, a response from policy server 18 may include a non-negative integer indicating a relative priority of the response: higher numbers indicating higher priority, and the value zero being used to completely deny a request. Such a priority value allows the LPM to sort previously-accepted requests against new requests and make a local decision (i.e., without further intervention by policy server 18) on whether to remove previously-accepted requests. For example, assume that a router has accepted two bandwidth reservations with priorities 2 and 5 to take up 800 Kbps of a maximum 1 Mbps available bandwidth. If a new request for 300 Kbps is accepted by policy server 18 at priority 7, the LPM can now remove the previously-accepted reservation at priority 2 to make room for the new reservation. In addition, or alternatively, policy server 18 may include a hold-off timer value in a response sent to policy client 22. The hold-off timer value specifies a time interval over which the response is valid so that the LPM may cache the results of the response for use over the interval. This mechanism avoids repeated queries to policy server 18 for the same or similar requests, thus reducing the processing load on both policy server 18 and policy client 22.

In such an implementation, the LPM keeps track of the admission state, hold-off timer, and priority associated with each accepted request. The LPM also communicates information pertinent to each request (e.g., the traffic specification for a bandwidth request, a user id, or source address) to policy server 18 using an extensible object format. The types of objects and their contents can be defined specific to a client type. For example, objects in an "RSVP" class can encapsulate bandwidth reservation information, whereas objects in a "Traffic" class can encapsulate requests for use of a particular user-priority. In addition, each request to policy server 18 can be assigned a locally unique RIH (Request Identification Handle) so that responses can be matched against requests when more than one request is outstanding. It should be noted, however, that the present invention is not limited by such implementation details.

Looking more closely at communications between policy server 18 and policy client 22, a suitable protocol for exchanging policy information can be relatively simple, consisting mainly of four types of messages: RQ (Request Query, used to query policy server 18), RR (Request Response, sent by policy server 18 in response to a query), DQ (Delete Request, used by policy client 22 to delete state associated with a previously-accepted request), and UR (Unsolicited Response, used by policy server 18 to modify its decision or priority associated with a previously-accepted request). For instance, policy client 22 can use such a protocol to query policy server 18 as to whether a reservation request can be accepted. In its query, policy client 22 includes objects that describe the bandwidth requirements and the requesting user's identity. In its response, policy server 18 accepts the request at a particular priority level (e.g., level 5) and also provides a policy object to be included when the reservation request is forwarded along the path to the sender. After a period of time, policy client 22 issues a request to delete the reservation, and also provides the start and ending time for the session so that policy server 18 can use the information for accounting and billing purposes. This exchange is illustrated below.

Client->Server: RQ
        "RIH=4, client type=RSVP, RSVP objects incl. Policy data"
        {client sends query asking whether reservation can be accepted}
    Server->Client: RR
        "RIH=4, Priority=5, OUT-POLICY object"
        {server accepts request (at priority 5) and provides policy object to be forwarded to next device in path}
    Client->Server: DRQ
        "RIH=4, Reason Code=TEAR, Start Timestamp, End Timestamp"
        {client requests deletion of request and provides duration of session information}

A significant component of any PBNM architecture is the method for specification and representation of policies. Since a PBNM architecture will generally be designed for policy-based control over the use of a variety of physical resources (e.g., network bandwidth) and logical resources (e.g., multicast channels), it is desirable for the method of policy specification to be independent of particular resource types. For purposes of illustration, the example PBNM architecture shown in FIG. 1 is assumed to implement policies directed substantially to admission control (e.g., whether an end user or an application will be allowed access to a particular multicast channel) or resource reservation (e.g., who is permitted to reserve a given amount of bandwidth on a particular part of the network). In addition, the illustrated architecture is assumed to support the specification of policy rules involving the following aspects: privileges based on an entity's identity, application of rules to groups of entities, restrictions based on time, restrictions based on the number or amount of usage, and support for logical combinations of basic rules.

One possible approach to policy specification for the PBNM architecture shown in FIG. 1 involves the use of a tree-based representation of rules that uses first-order logic for combining basic elements. A general tree-based representation of resource usage/access policies is partially shown in FIG. 3. The illustrated tree structure makes it possible to specify a plurality of policy modules 52, 54 for one or more managed resources 50. For example, policy module 52 and policy module 54 represent specific rules that specify restrictions on accessing resource 50. In a typical implementation, there would be policy modules relating to a plurality of managed resources. Moreover, a given policy module can apply to only a single resource and/or the tree structure could be arranged such that a policy module applies to a plurality of resources. In the example shown, policy modules 52 and 54 are logically "OR'ed" together to specify alternative rules that apply to resource 50 (i.e., only one of the rules needs to be satisfied for the rule to apply).

Moving further down the tree structure, policy module 52 comprises a combination of policy categories 56, 58 that are logically "AND'ed" together. Each policy category 56, 58 represents a distinct classification, such as user identity, source hosts, time ranges, and so on. Together, policy categories 56, 58 form a single rule (i.e., policy module 52) that applies to resource 50. Policy categories may also comprise exclusions by using, for example, a negation operator (e.g., NOT).

Moving still further down the tree structure, policy category 56 comprises a plurality of element groups 60, 62 that are logically "OR'ed" together. Finally, at the bottom level of the tree structure, the leaves represent basic elements or entities 64, 66 identifying, for example, such details of policy module 52 as a network number, particular userids, or host addresses. As can be seen, an element group constitutes an OR'ed combination of a set of leaves (i.e., entities).

Figure 3:
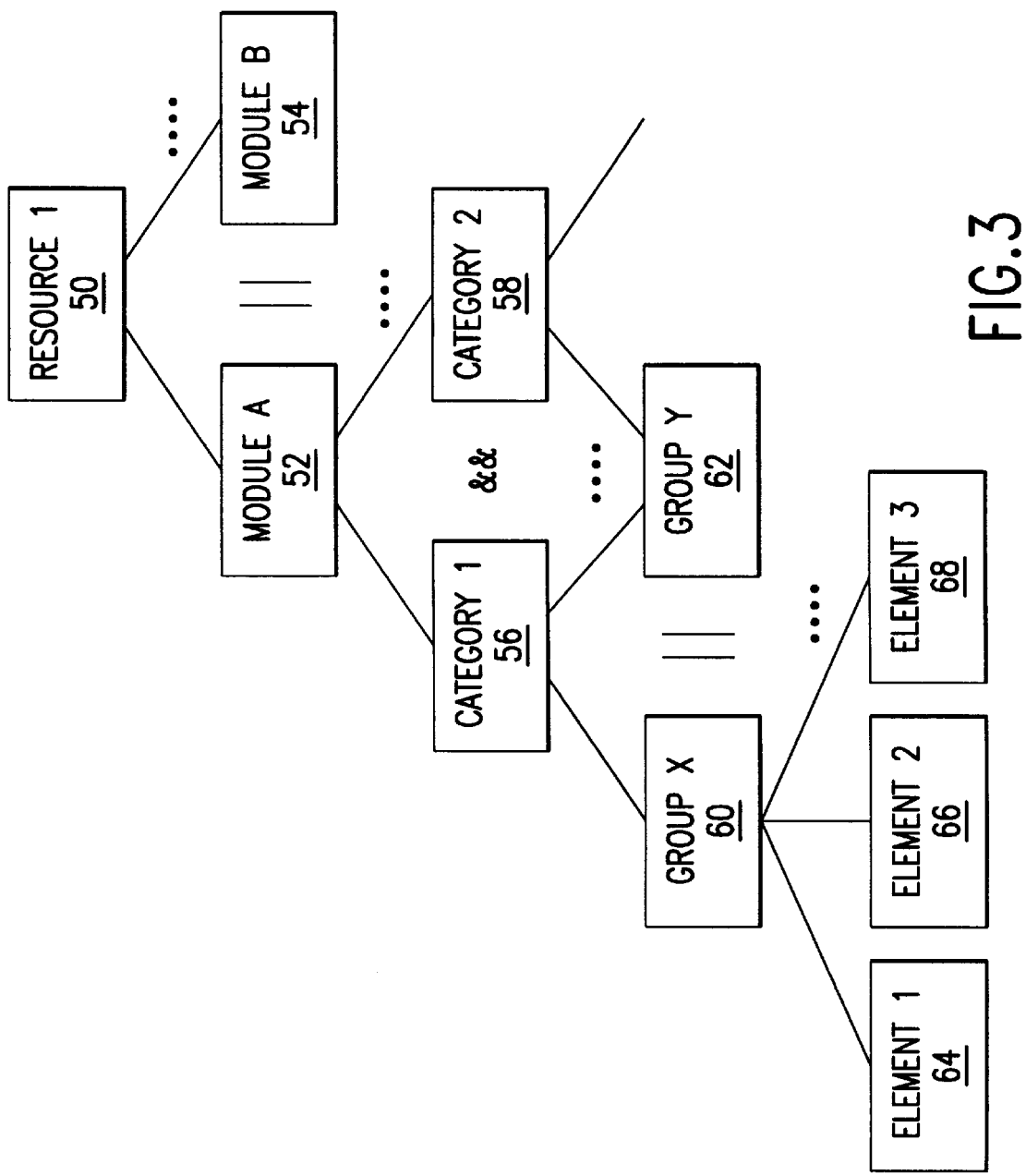
FIG. 3 is a diagram of a tree-based approach to policy specification for use in accordance with the PBNM architecture of FIG. 1.
Figure 4:
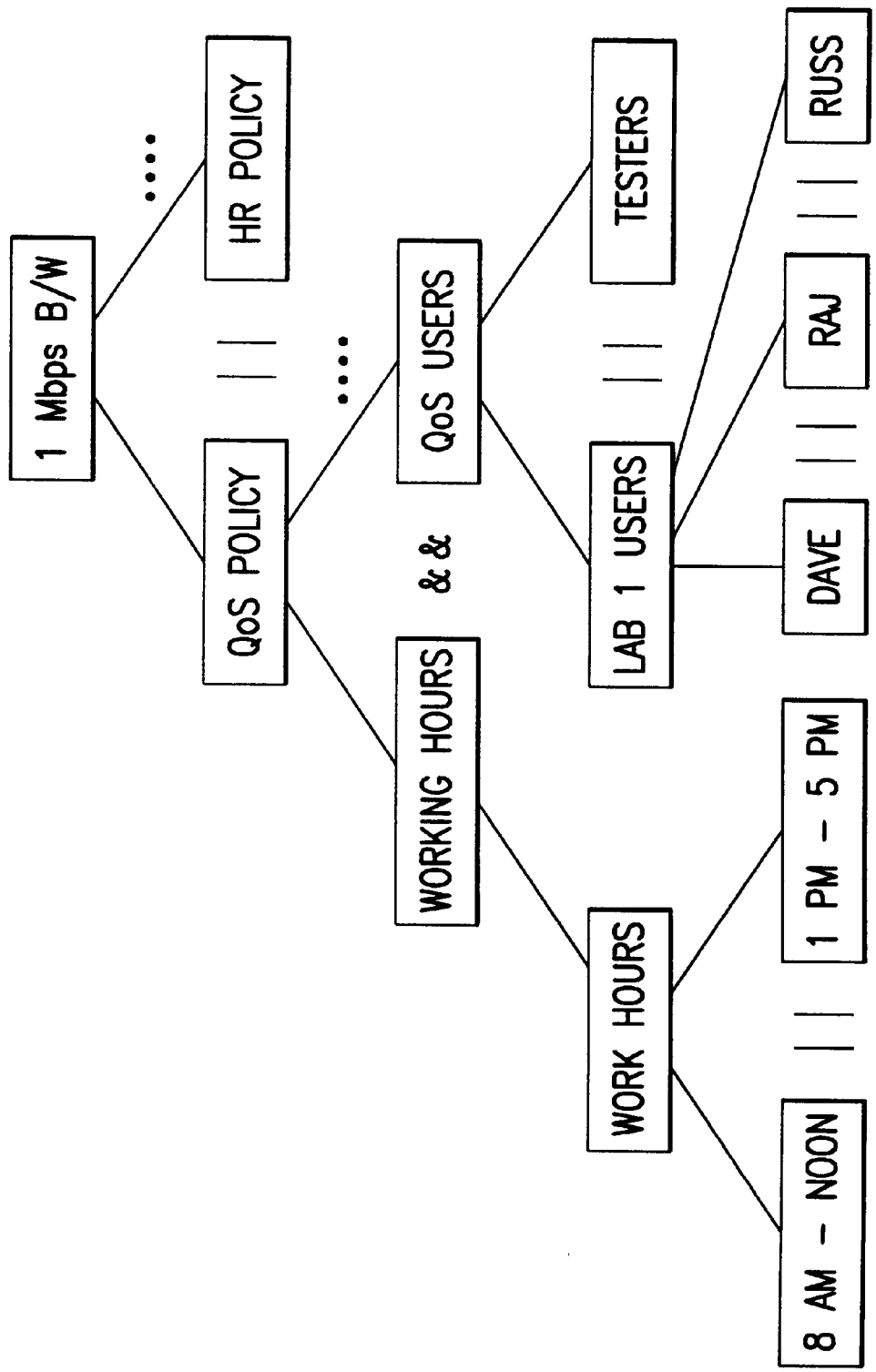
FIG. 4 is an example of a particular implementation of the tree-based approach to policy specification shown in FIG. 3.

By way of further example, FIG. 4 illustrates a particular implementation of a tree structure such as that shown in FIG. 3. Given the foregoing description, it can be seen that this sample tree structure implements the following policy:

No more than 1 Mbps bandwidth can be used by members of user group QoSUsers during the work hours of 8am–noon or 1pm–5pm In accordance with embodiments of the present invention, a PBNM architecture, such as that illustrated in FIG. 1, can advantageously be configured such that policies are synthesized, installed and removed in an automated fashion, essentially on an as-needed basis. In general, to accomplish this a set of policy rules applicable to one or more managed network resources is implemented at a policy server. When a particular policy rule is satisfied, the policy server dynamically generates one or more policies and installs them at appropriate policy decision points. Once the installed policies are no longer necessary or useful, they are removed from the PDPs.

Figure 5:
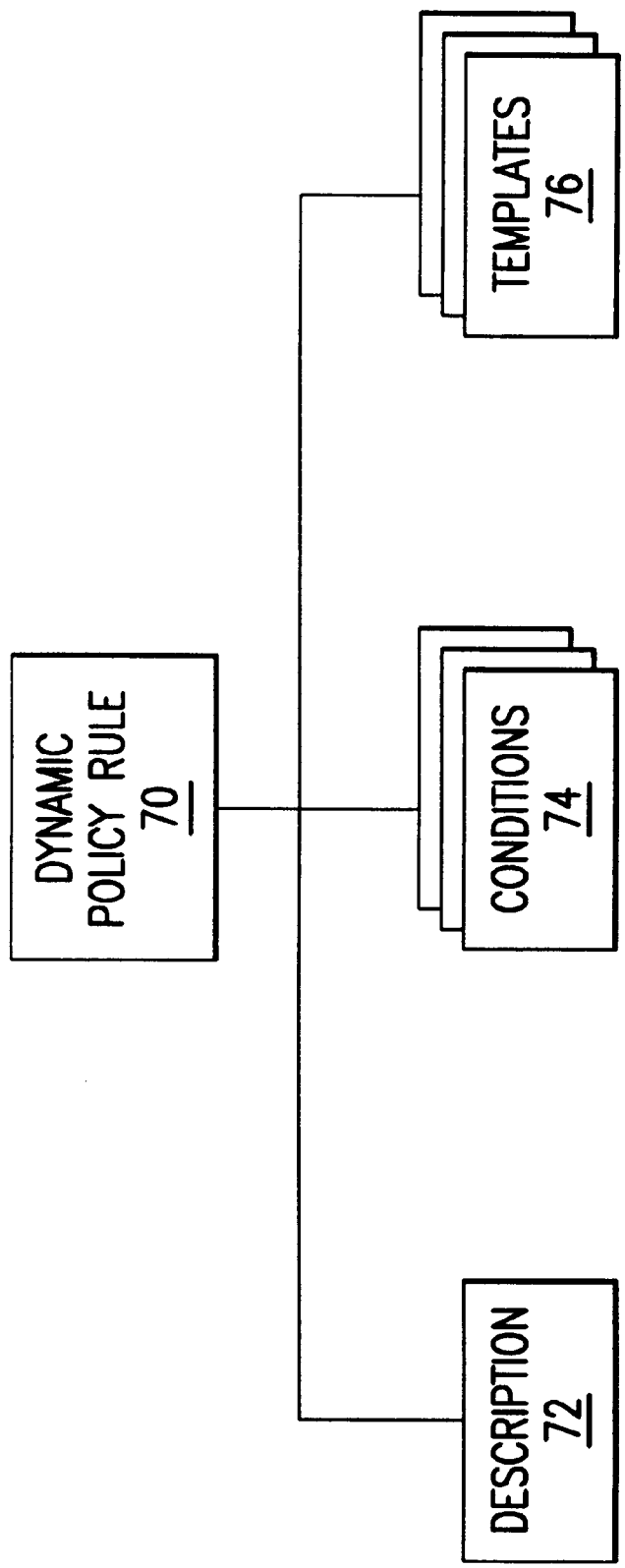
FIG. 5 is a block diagram illustrating a data structure for use in dynamic policy generation in accordance with an embodiment of the present invention.

Such an embodiment may be implemented, for example, using a dynamic policy rule 70 such as that illustrated in FIG. 5. Dynamic policy rule 70 comprises a data structure that includes a description 72, a set of conditions 74, and a set of policy templates 76. Description 72 is simply a human-readable textual description of the purpose or goal of the dynamic policy rule 70, and is provided merely for administrative convenience. Conditions 74 are used to determine whether dynamic policy rule 70 is triggered. Like the tree structure discussed above with reference to FIGS. 3 and 4, conditions 74 may consist of a plurality of policy conditions combined with logical operators (e.g., AND, OR, NOT).

Policy templates 76 are data structures used to dynamically generate policies for installation at a PDP upon satisfaction of conditions 74. Each policy template 76 corresponds to a predefined policy, and may include variables or "wildcards" that are filled in with information relating to, for example, satisfied conditions, the network resource sought to be accessed, the identity of the entity requesting access to the network resource, and so on. Policy templates 76 can be configured on a per-rule basis.

To illustrate the use of dynamic policy rules such as that shown in FIG. 5, consider a policy rule directed to ensuring that a particular user (i.e., John Doe) is always able to access an inventory database resident on an SAP server in a corporate intranet (i.e., an inter-enterprise server developed by SAP AG). This sample policy rule has two conditions associated with it:

Condition 1: John Doe must be able to reserve at least 100 Kbps of bandwidth between wherever he is on the network and the database server.

Condition 2: The load on the database server must be kept below a certain limit (i.e., 2.00) whenever John Doe is connected to the network.

The sample policy rule also has two policy templates associated with it for ensuring that the foregoing policy conditions are met. First, a network management policy template will generate a policy that allows John Doe to make a reservation for 100 Kbps of bandwidth on each of the routers on the path between John Doe and the SAP server, preempting other users' reservations if necessary. For example, such a template might be: "Allow John Doe to reserve 100 Kbps of traffic on router_x for SAP traffic," where router_x is filled in once a trigger is activated with the list of routers in the path between John Doe and the SAP server. This policy will be installed only on the specific routers between John Doe and the SAP server, and will only apply to reservations made for SAP traffic. Similarly, a system management policy template will generate a policy that specifies that the inventory server must reject any new requests by users other than John Doe if the server load is greater than 2.00. This policy will be installed on the SAP server itself.

In the foregoing example, the trigger that causes the policy rule to be evaluated is John Doe logging in or out at any host on the network. More generally, it will be appreciated that appropriate policy rules are generated and installed/uninstalled based on rule templates as a result of a trigger even occurring, for example, at a PDP or a PEP. Moreover, any device (i.e., not just PDPs or PEPs) can readily be configured to support such triggers by relaying the occurrence of a trigger event to a device configured to act on the trigger.

By way of further illustration, FIG. 6 provides a flow diagram describing how the foregoing example policy rule is processed. With further reference to the architecture shown in FIG. 1, assume that John Doe logs onto a host computer (Step 100) that includes PDP logic. The PDP is configured to recognize this as a trigger event, and transmits a message to an associated policy server 18 detailing the event. Policy server 18 then determines whether it has a policy rule corresponding to the trigger event (Step 110). If so, policy server 18 identifies all of the network resources involved with the policy rule (Step 120). To obtain such information, the policy rule can be configured with logic to query the MIBs on network devices or to consult a store of network information, such as a directory server.

In this example, policy server 18 will identify (1) the SAP server and (2) all routers between the host computer and the SAP server. Policy server 18 then determines whether John Doe is logging in or logging out (Step 130) based on the information passed by the host computer. Here, since John Doe is logging in, policy server 18 uses the policy templates associated with the policy rule to generate appropriate policies for each of the involved network resources (Step 140), and deploys the policies to those network resources (Step 150). Had policy server 18 determined that the trigger event was John Doe logging out, policy server 18 would have caused the previously-deployed policies to be removed from each of the network resources (Step 160).

In contrast to current practice in PBNM systems, embodiments of the present invention eliminate the need for all currently-specified policies to be installed and evaluated at each PDP associated with a managed network resource. Instead, it is possible to reduce the policies installed on a PDP to a working set of policies that are actually needed at a given time. Persons skilled in the art will readily recognize the benefits of such an approach, such as significantly reducing the processing load on individual PDPs and PEPs. For example, it is not necessary for a PDP to continually evaluate conditions for each and every established policy.

PEPs also need not evaluate as many conditions. For instance, if no policies are currently installed on the PEP which deal with a particular type of request, the PEP will not need to query a PDP whenever a request of that type occurs. Similarly, a PDP will not have to process a long list of policies to evaluate whether to allow such a request. Rather, the use of policy templates makes it possible to ensure that the policies installed on a PDP are much more specific than would otherwise be possible, since it is not necessary to try to accommodate a wide variety of different conditions through, for example, the use of wildcards.

As noted above, policy rules are typically installed on a policy server in accordance with embodiments of the present invention. The conditions associated with a given policy rule may be evaluated periodically by the policy server, or may be evaluated in response to some trigger event, as in the foregoing example. This latter approach has the advantage of leveraging current PBNM architectures wherein PDPs automatically evaluate policy conditions when a request is made for a managed resource. That is, the existing processing could be modified such that the evaluation of policy conditions would alternatively, or additionally, trigger a policy server to evaluate any policy rules that contained those conditions.

The foregoing is a detailed description of particular embodiments of the claimed invention; however, the claimed invention also embraces all alternatives, modifications and variations that fall within the letter and spirit of the appended claims, as well as all equivalents of the claimed subject matter. For example, trigger processing can be installed on devices other than PDPs or PEPs, such as work stations. In accordance with another possible alternative, the infrastructure used for dynamic policy generation can be implemented physically separate from the basic PBNM architecture by, for example, providing separate policy rule evaluation servers that interact with trigger devices and remotely configure PDPs. Similarly, a PBNM system could be configured such that a policy server communicates with a policy management device configured to generate policies, install policies on the policy server, and remove policies from the policy server. Persons skilled in the art will recognize that many other alternatives, modifications and variations are also possible.

What is claimed:

1. A computer-implemented method comprising:
   evaluating a condition relating to a network resource;
   generating instructions for managing access to the network resource in response to the evaluation; and
   transmitting the instructions for installation on a network device providing access to the network resource.

2. The computer-implemented method of claim 1, wherein the instructions are generated from a template.

3. The computer-implemented method of claim 2, wherein the instructions are customized using information relating to the evaluated condition.

4. The computer-implemented method of claim 2, wherein the template is selected from a plurality of templates based on information relating to the evaluated condition.

5. The computer-implemented method of claim 1, further comprising removing the instructions from the network device after execution.

6. The computer-implemented method of claim 1, wherein the condition is evaluated periodically.

7. The computer-implemented method of claim 1, wherein the condition is evaluated in response to a predetermined event.

8. The computer-implemented method of claim 7, wherein the predetermined event relates to an attempt to access the network resource.

9. The computer-implemented method of claim 1, further comprising generating instructions for installation on each of a plurality of network devices providing access to the network resource.

10. The computer-implemented method of claim 1, further comprising generating instructions for managing access to a plurality of network resources associated with the evaluated condition.

11. A machine-readable medium having stored thereon a plurality of executable instructions to perform a method comprising:
    evaluating a condition relating to a network resource;
    generating a module for managing access to the network resource in response to the evaluation; and
    transmitting the module for installation on a network device providing access to the network resource.

12. The storage medium of claim 11, wherein the set of instructions further comprises instructions for generating the module from a template.

13. The storage medium of claim 12, wherein the set of instructions further comprises instructions for customizing the module using information relating to the evaluated condition.

14. The storage medium of claim 12, wherein the set of instructions further comprises instructions for selecting the template from a plurality of templates based on information relating to the evaluated condition.

15. The storage medium of claim 11, wherein the set of instructions further comprises instructions for removing the module from the network device after execution.

16. The storage medium of claim 11, wherein the set of instructions further comprises instructions for evaluating the condition periodically.

17. The storage medium of claim 11, wherein the set of instructions further comprises instructions for evaluating the condition in response to a predetermined event.

18. The storage medium of claim 17, wherein the predetermined event relates to an attempt to access the network resource.

19. The storage medium of claim 11, wherein the set of instructions further comprises instructions for generating a plurality of modules and respectively installing them on a plurality of network devices providing access to the network resource.

20. The storage medium of claim 11, wherein the set of instructions further comprises instructions for generating modules for managing access to a plurality of network resources associated with the evaluated condition.

21. A policy-based network management system comprising:
    a policy enforcement point to selectively enable access to a network resource;
    a policy decision point in communication with the policy enforcement point, the policy decision point to authorize access to the network resource through the policy enforcement point in accordance with an established policy; and
    a policy server in communication with the policy decision point, the policy server to maintain a template for dynamically establishing a policy concerning access to the network resource and communicating the established policy for installation on the policy decision point.

22. The policy-based network management system of claim 21, wherein the policy server generates a policy in response to satisfaction of a predetermined condition.

23. The policy-based network management system of claim 22, wherein the policy server evaluates the predetermined condition periodically.

24. The policy-based network management system of claim 22, wherein the policy server evaluates the predetermined condition upon detection of a network event.

25. A policy-based network management system comprising:

a policy enforcement point to selectively enable access to a network resource;

a policy decision point in communication with the policy enforcement point, the policy decision point to authorize access to the network resource through the policy enforcement point in accordance with an established policy; and a policy server in communication with the policy decision point, the policy server to maintain a template for dynamically establishing a policy concerning access to the network resource and communicating the established policy to the policy decision point, the established policy comprising a set of instructions installed on the policy decision point.

26. The policy-based network management system of claim 25, wherein the policy server generates a policy in response to satisfaction of a predetermined condition.

27. The policy-based network management system of claim 26, wherein the policy server evaluates the predetermined condition periodically.

28. The policy-based network management system of claim 26, wherein the policy server evaluates the predetermined condition upon detection of a network event.

29. A policy-based network management system comprising:

a policy enforcement point to selectively enable access to a network resource;

a policy decision point in communication with the policy enforcement point, the policy decision point to authorize access to the network resource through the policy enforcement point in accordance with an established policy; and a policy server in communication with the policy decision point, the policy server to maintain a template for dynamically establishing a policy concerning access to the network resource and communicating the established policy to the policy decision point, the established policy being removed from the policy decision point upon occurrence of a predetermined event.

30. The policy-based network management system of claim 29, wherein the policy server generates a policy in response to satisfaction of a predetermined condition.

31. The policy-based network management system of claim 30, wherein the policy server evaluates the predetermined condition periodically.

32. The policy-based network management system of claim 30, wherein the policy server evaluates the predetermined condition upon detection of a network event.

33. A policy-based network management system comprising:

a policy enforcement point to selectively enable access to a network resource;

a policy decision point in communication with the policy enforcement point, the policy decision point to authorize access to the network resource through the policy enforcement point in accordance with an established policy;

a policy server in communication with the policy decision point, the policy server to maintain a template for dynamically establishing a policy concerning access to the network resource and communicating the established policy to the policy decision point; and a plurality of policy decision points coupled to the policy server, each of the plurality of policy decision points to authorize access to a different network resource.

34. The policy-based network management system of claim 33, wherein the policy server generates a policy in response to satisfaction of a predetermined condition.

35. The policy-based network management system of claim 34, wherein the policy server evaluates the predetermined condition periodically.

36. The policy-based network management system of claim 34, wherein the policy server evaluates the predetermined condition upon detection of a network event.

37. A policy-based network management system comprising:

a policy enforcement point to selectively enable access to a network resource;

a policy decision point in communication with the policy enforcement point, the policy decision point to authorize access to the network resource through the policy enforcement point in accordance with an established policy;

a policy server in communication with the policy decision point, the policy server to maintain a template for dynamically establishing a policy concerning access to the network resource and communicating the established policy to the policy decision point; and a plurality of policy enforcement points coupled to the policy decision point, each of the plurality of policy enforcement points to selectively enable access to the network resource.

38. The policy-based network management system of claim 37, wherein the policy server generates a policy in response to satisfaction of a predetermined condition.

39. The policy-based network management system of claim 38, wherein the policy server evaluates the predetermined condition periodically.

40. The policy-based network management system of claim 38, wherein the policy server evaluates the predetermined condition upon detection of a network event.

41. A policy-based network management system comprising:

a policy enforcement point to selectively enable access to a network resource;

a policy decision point in communication with the policy enforcement point, the policy decision point to authorize access to the network resource through the policy enforcement point in accordance with an established policy; and a policy server in communication with the policy decision point, the policy server to maintain a template for dynamically establishing a policy concerning access to the network resource and communicating the established policy to the policy decision point, and the policy server to maintain a plurality of templates for dynamically establishing a policy concerning access to each of a plurality of network resources.

42. The policy-based network management system of claim 41, wherein the policy server generates a policy in response to satisfaction of a predetermined condition.

43. The policy-based network management system of claim 42, wherein the policy server evaluates the predetermined condition periodically.

44. The policy-based network management system of claim 42, wherein the policy server evaluates the predetermined condition upon detection of a network event.

45. A policy-based network management system comprising:
- a policy enforcement point to selectively enable access to a network resource;
- a policy decision point in communication with the policy enforcement point, the policy decision point to authorize access to the network resource through the policy enforcement point in accordance with an established policy;
- a policy server in communication with the policy decision point, the policy server to maintain a template for dynamically establishing a policy concerning access to the network resource and communicating the established policy to the policy decision point, and the policy server being in communication with a policy management device, the policy management device to perform at least one of the functions of generating policies, installing policies on the policy server, and removing policies from the policy server.

46. The policy-based network management system of claim 45, wherein the policy server generates a policy in response to satisfaction of a predetermined condition.

47. The policy-based network management system of claim 46, wherein the policy server evaluates the predetermined condition periodically.

48. The policy-based network management system of claim 46, wherein the policy server evaluates the predetermined condition upon detection of a network event.

* * * * *